US008645817B1

(12) United States Patent
Fisher

(10) Patent No.: US 8,645,817 B1
(45) Date of Patent: Feb. 4, 2014

(54) APPARATUSES, METHODS AND SYSTEMS FOR ENHANCED POSTED LISTING GENERATION AND DISTRIBUTION MANAGEMENT

(75) Inventor: Clay Fisher, Columbus, OH (US)

(73) Assignee: Monster Worldwide, Inc., New York, NY (US)

( * ) Notice: Subject to any disclaimer, the term of this patent is extended or adjusted under 35 U.S.C. 154(b) by 1395 days.

(21) Appl. No.: 11/618,595

(22) Filed: Dec. 29, 2006

(51) Int. Cl.
*G08B 13/14* (2006.01)

(52) U.S. Cl.
USPC ......................................................... 715/243

(58) Field of Classification Search
USPC ......................................................... 715/243
See application file for complete search history.

(56) References Cited

U.S. PATENT DOCUMENTS

| 6,370,510 | B1 * | 4/2002 | McGovern et al. ................ 705/1 |
| 6,385,620 | B1 * | 5/2002 | Kurzius et al. ............. 707/104.1 |
| 7,519,621 | B2 | 4/2009 | Harik |
| 2001/0037223 | A1 * | 11/2001 | Beery et al. ........................ 705/4 |
| 2002/0002479 | A1 | 1/2002 | Almog et al. |
| 2002/0024539 | A1 * | 2/2002 | Eleftheriadis et al. ........ 345/765 |
| 2003/0037032 | A1 | 2/2003 | Neece et al. |
| 2004/0138112 | A1 | 7/2004 | Cassart et al. |
| 2007/0050257 | A1 | 3/2007 | Fine |
| 2007/0100803 | A1 | 5/2007 | Cava |
| 2007/0162323 | A1 | 7/2007 | Gorham |
| 2007/0185884 | A1 * | 8/2007 | Kantamneni ................... 707/10 |
| 2007/0239777 | A1 * | 10/2007 | Toomey ..................... 707/104.1 |
| 2007/0260597 | A1 | 11/2007 | Cramer |
| 2008/0059523 | A1 * | 3/2008 | Schmidt et al. ............ 707/104.1 |
| 2008/0155588 | A1 * | 6/2008 | Roberts et al. .................. 725/34 |

* cited by examiner

*Primary Examiner* — Doug Hutton, Jr.
*Assistant Examiner* — Zaida I Marrero
(74) *Attorney, Agent, or Firm* — Cooley LLP; Walter G. Hanchuk; Nathan W. Poulsen

(57) ABSTRACT

The Enhanced Posted Listing Management (EPLM) system facilitates generating, distributing, managing and tracking posted listing that are based on a sponsor's underlying data entry. The underlying data entry may be configured as an advertisement or offer for any number of goods, services or opportunities. As an example, the data entry may be a posting on specialized search facilitation site, such as MONSTER® of www.Monster.com. The posted listings may be distributed to a posted listing aggregation web site, such as an online classified web site. Advantageously, the post EPLM system incorporates additional support resources into posted distributed listings. The additional support resources facilitate web user tracking and posted listing maintenance. Accordingly, the EPLM enable a posted listing sponsor to effectively and efficiently access posted listing performance and manage one or more posted listings.

44 Claims, 10 Drawing Sheets

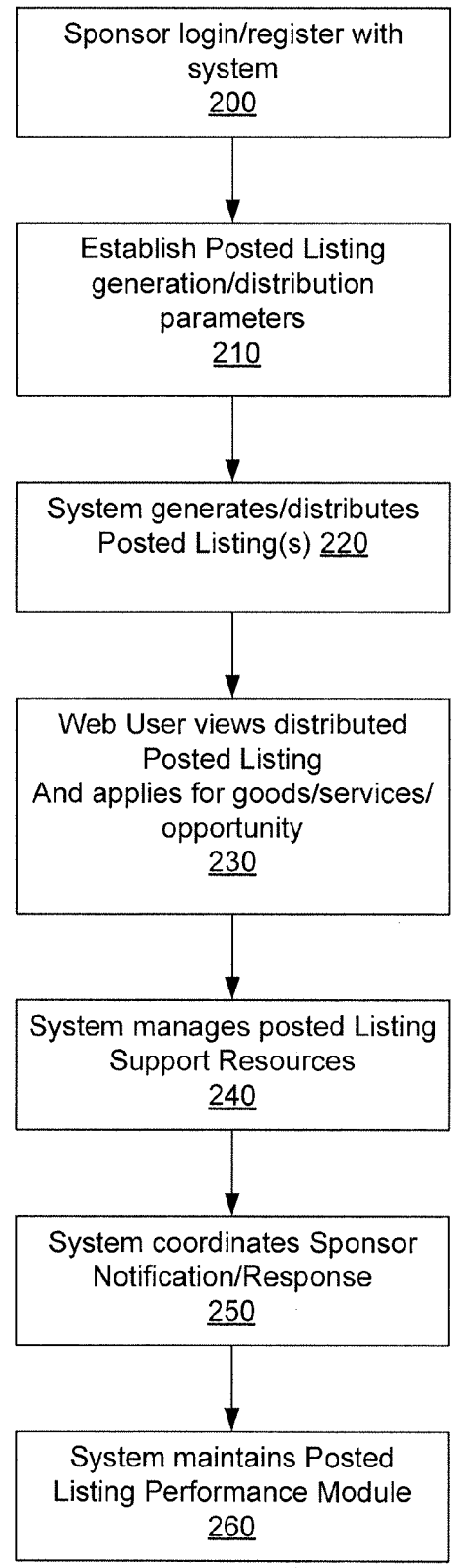

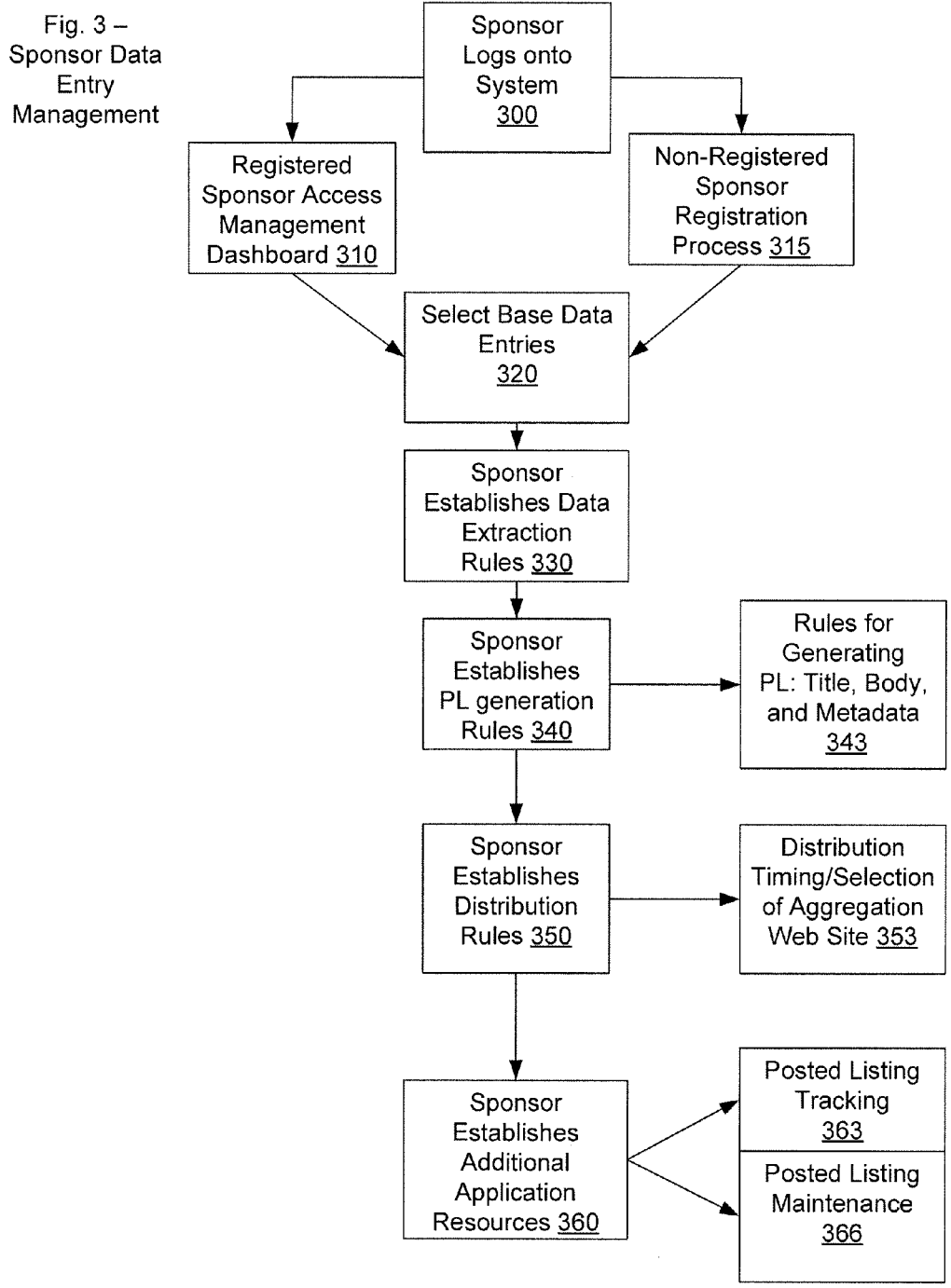

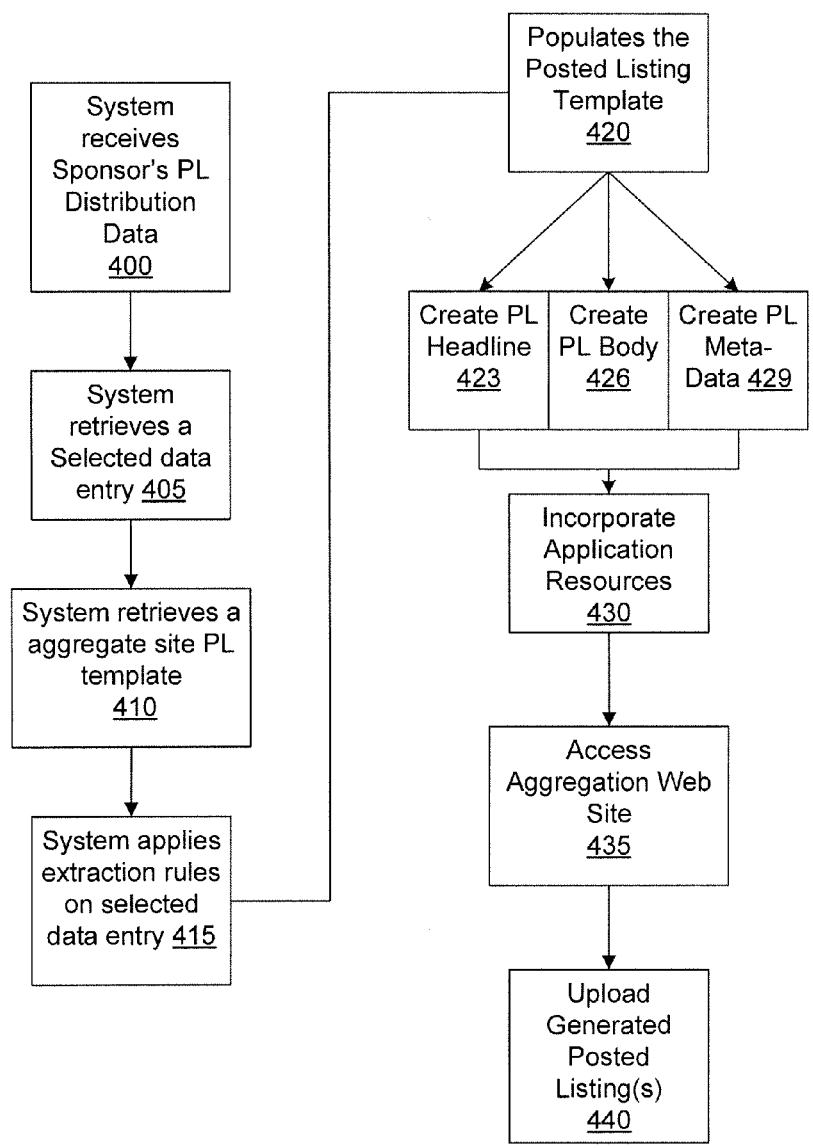
Fig. 4A – Posted Listing Generation

Fig. 4B monster | Search Jobs | My Monster | For Employers
450

460 — Software Engineer 455 ABC Software Co.

465 — Starting Pay: $100,000

470 — Job Location:
New York, New York

475 — Job Description:
Will design, develop and maintain software on Microsoft .Net platform. Serve as technical lead on development efforts, including participating in requirements analysis and design. Will have responsibility for developing solutions for all tiers of the application; code-behinds, controls, middle-tier business components, database layer, etc. Assist in formulating standards and development practices across multiple related teams.

480 — Qualifications:
  * Two or more years of extensive experience with C# and ASP.NET is ideal.
  * Knowledge in OO development principles, multi-tier web application design and relational database principles required.
  * History of delivering XML-based, Webservice, Component-Based and Multi-Threaded applications to production is desired.
  * Experience working with large project team development environments.
  * Good fundamental and hands on knowledge of with MS SQL Server.
  * Strong Analytical Skills and good problem solving skills.
  * Experience working in a regionally distributed development group.
  * Prior use of NAnt, NUnit, NDoc and CruiseControl.Net, or similar products would be a plus.

485 — The Benefits:

| Health benefits: | Employer provided benefits: |
|---|---|
| Blue Cross and Blue Shield PPO Program | Life Insurance |
| Guardian DMO and Dental PDO Plans | Short Term and Long Term Disability Plans |
| Vision care | Employee Assistance Plan |
| Flexible Spending Accounts | Competitive Paid Time Off program |
| Supplement life insurance for employees and their families | Education Tuition Reimbursement Plan for Continuing Education |
| Discounted auto and homeowners insurance | | monster  APPLY NOW
490

Fig. 4C -
Generic Non-
HTML Posting

| Non-HTML Posting | 451 |

ABC Software – Software Engineer

Job Description - Will design, develop and maintain software on Microsoft .Net platform. Serve as technical lead on development efforts, including participating in requirements analysis and design.

Qualification:
Two or more years C# and ASP.NET.
Knowledge in OO development principles, multi-tier web application design and relational database principles required.

Starting Pay: $100,000
Job Location: New York, New York

Please reference Job ID: 123-456SFTWR when you submit a resume. Visit http://www.monsterjobs.lite.com/123-456SFTWR.html to view the full job description and apply for this job or send an email reply to: R12345678@JobPost.com to submit an application for this opportunity.

Already a Registered Monster User? To apply by phone at 1-800-MONSTER, Login and enter job ID 123-456SFTWR to apply for this opportunity via automated login/apply system.

HTML Posting — 452

Software Engineer — 460, 475

ABC Software Co. — 455

Job Description - — 480
Define, design and implement complex multi-tier distributed software applications for user/business functionality. Segment and design system layers to support component/layered application development.

Qualification:
Two or more years C# and ASP.NET.
Knowledge in OO development principles, multi-tier web application design and relational database principles required.

Starting Pay: $100,000
Job Location: New York, New York — 465

To View the Full Job Description, Visit - 
http://lite.monster.com/123-456SFTWR.html to find out more information! — 468

To apply through aggregation site, please click here — 473

Click here to register with Monster.com and apply for this job: http://registration.lite.monster.com/123-456SFTWR.html — 476

Posting Powered By:
Sign up for a free monster account today or learn more.

Click here to forward the posted listing to a friend monster — 493

Already a Registered Monster User? Click here to login and apply for this job.

Fig. 5A – Web User Interaction
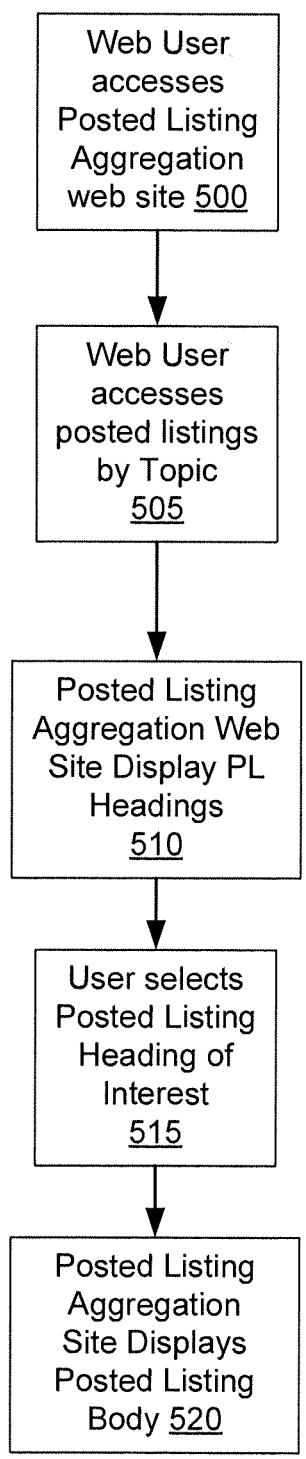

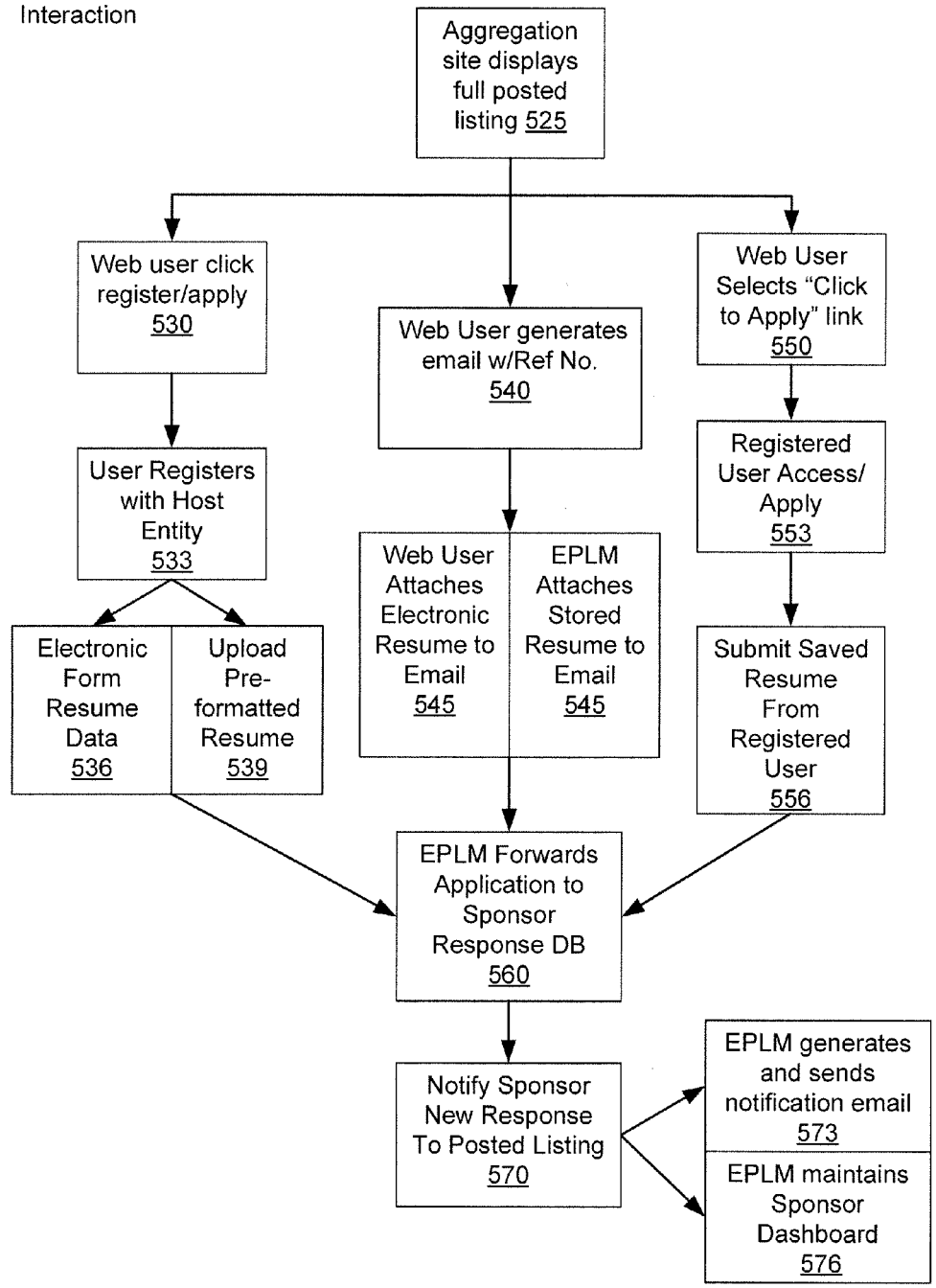
Fig. 5B – Web User Interaction

APPARATUSES, METHODS AND SYSTEMS FOR ENHANCED POSTED LISTING GENERATION AND DISTRIBUTION MANAGEMENT

CO-PENDING RELATED APPLICATION

The co-pending related application titled, "Apparatuses, Methods And Systems For Enhanced Posted Listing Support Resource Management", filed Dec. 29, 2006, with Ser. No. 11/618,587 is incorporated by reference herein.

FIELD OF THE INVENTION

The present invention is directed generally to apparatuses, methods, and systems for generating and managing posted listings. More specifically, the apparatuses, methods and systems described herein facilitate generating, distributing and managing posted listings, as well as providing supplemental support resources.

BACKGROUND

Sponsor entities create advertisements or offers for available goods, services or opportunities and have several available options for distributing these advertisements to the public. One of the options available for sponsor entities involves posted listing aggregation web sites. These web sites are configured in a way that is similar to a newspaper classified section—providing a centralized location for multiple users to create and publish listings which may describe goods, services, or opportunities that are available to the public. Often such sites publish listings for free or for a nominal charge. The simplicity, ease of use and inexpensive nature of posted listing aggregation web sites have contributed to a broad proliferation across the internet of these types of sites. Fundamentally, posted listing web sites are based on a passive approach to distributing posted listings—publishing a listing and waiting for a web user to search the internet and find the offered good, service or opportunity.

However, this approach also presents several obstacles for posted listing sponsors (the entities that offer the available goods/services/opportunities). Posted listings often include a short description of an available good, service, or opportunity, as well as an email contact for responding to the available goods, services or opportunities. It is difficult to evaluate the efficacy of this type of posted listing. Generally, posted listing aggregation web sites do not facilitate determining performance metrics related to the quality and/or quantity of web user interaction with a particular posted listing. Furthermore, there are significant issues the related to effective life-span of a posted listing. When a sponsor entity generates a posted listing, the new posted listing is often simply added to a queue of listings displayed based on the time/date of the posting. As such, the posted listing's prominence only lasts until another web user generates a new posted listing on the aggregation web site. For these reasons, the efficacy and lifespan of a posted listing may be extremely limited.

SUMMARY OF THE INVENTION

The disclosure details an implementation of apparatuses, methods, and systems associated with an Enhanced Posted Listing Management (EPLM) tool. An EPLM system facilitates generating, distributing, managing and tracking posted listings based on a sponsor's underlying data entry. The underlying data entry may be configured as an advertisement or offer for any number of goods, services or opportunities. By way of example only, the underlying data entry may be published as an entry on a specialized search web site.

The EPLM system is configured to extract information from underlying data entries, generate and distribute posted listings to a posted listing aggregation web site, such as an online classified web site. One embodiment of the EPLM system is also configured to incorporate supplemental posted listing support resources into distributed posted listings. Depending on the actual implementation, the support resources may be configured to facilitate web user data collection, posted listing maintenance, and/or coordinate web user functionality with both the aggregation web site and the data entry host web site. Accordingly, the EPLM system enables a posted listing sponsor to effectively and efficiently create and distribute one or more posted listings, as well as, determine posted listing performance.

In an employment opportunity search implementation, a data entry sponsor entity (e.g., a potential employer) interacts with the system to create posted listings based on a sponsor's data entry describing an available good, service or opportunity (e.g., an employment opportunity). The sponsor's data entries may be aggregated in a specialized search repository (e.g., an employment opportunity search web site). The sponsor entity may be presented with the option to designate particular specific data entries as candidates for distribution as posted listings, which are incorporated into posted listing aggregation web sites (e.g., an online classified web site). In an embodiment, the sponsor may be provided with a bulk upload tool that facilitates bulk uploads of the designated data entries into the system For the purposes of illustration, an embodiment of the invention will be described below within the context of generating, distributing and managing posted listings related to employment opportunities. However, it is to be understood that the EPLM system facilitates a significant flexibility and that the EPLM system may be configured to facilitate any number of applications with posted listings directed to any number of goods, services or opportunities.

BRIEF DESCRIPTION OF THE DRAWINGS

The accompanying drawings illustrate various non-limiting, example, inventive aspects in accordance with the present disclosure:

FIG. 2 is an overview flow diagram illustrating aspects of posted listing generation, distribution and support resource functionality associated with the EPLM system, according to an embodiment of the invention;

FIG. 3 is a flow diagram illustrating aspects of interaction between a data entry sponsor and the EPLM system, according to an embodiment of the invention.

FIGS. 4A-4D include a flow diagram of the posted listing generation/distribution process, as well as examples of a data entry and posted listings, according to an embodiment of the invention;

FIG. 5A-5B are flow diagrams illustrating aspects of a web user's interaction with a distributed posted listing, according to an embodiment of the invention.

The leading number of each reference number within the drawings indicates the figure in which that reference number

DETAILED DESCRIPTION

Enhanced Posted Listing Management System Overview

Figure 1:
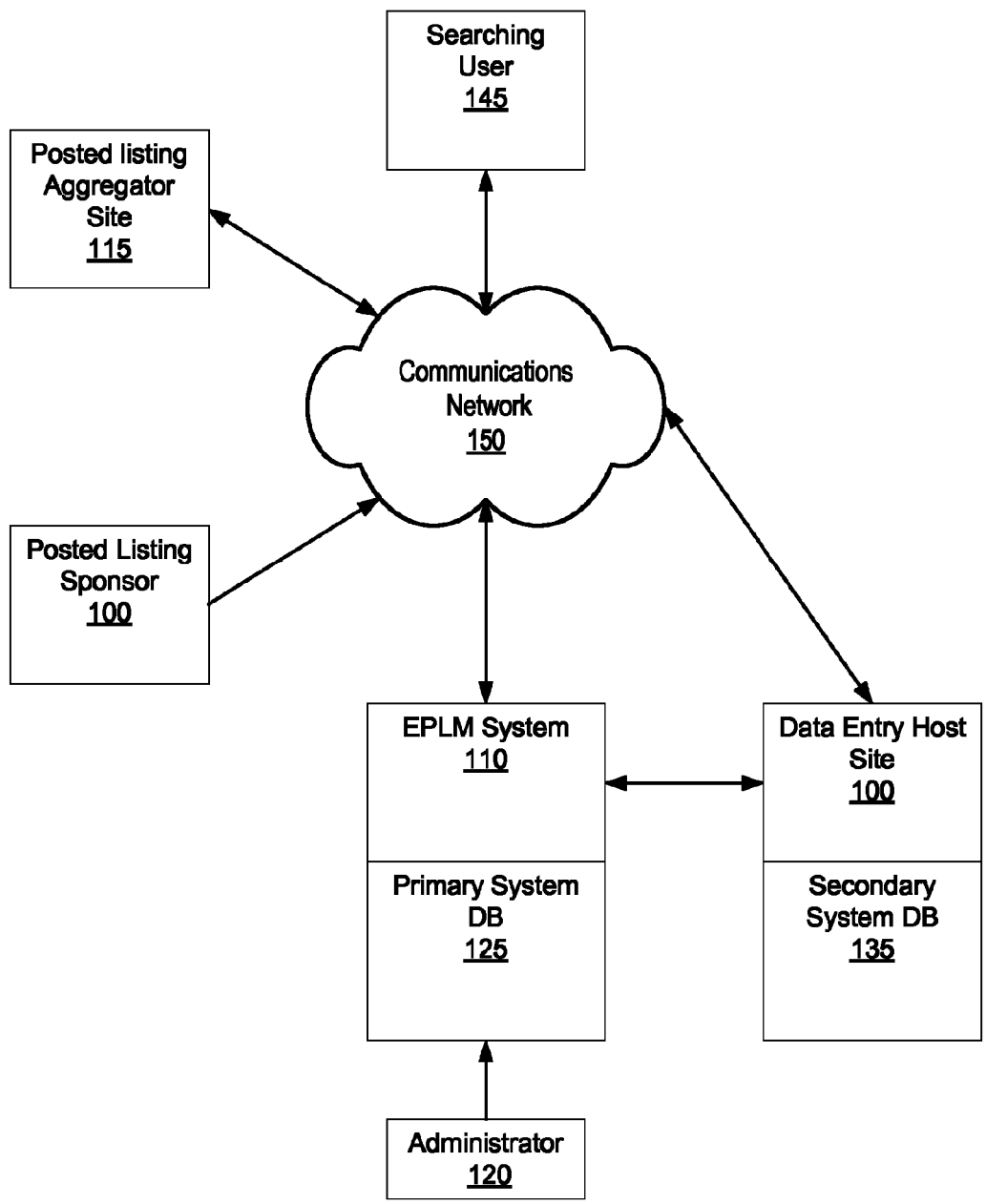
FIG. 1 is a high-level diagram illustrating that various entities that may interact with an embodiment of the invention.

FIG. 1 is a high-level diagram illustrating some of the various entities that interact with an Enhanced Posted Listing Management (EPLM) system, according to an embodiment of the invention. More specifically, the diagram illustrates the entities involved with generating, managing, distributing, viewing, tracking and recording data associated with a particular posted listing. For the purposes of illustrating of the invention, the system will be discussed within the context of an employment opportunity placement/search tool. However, it is to be understood there is significant flexibility and scalability associated with the system. As such, there are a wide variety of possible EPLM system implementations that may be configured to meet the needs of data entry sponsors.

In the implementation illustrated in FIG. 1, a posted listing sponsor (potential employer) 100 logs onto the EPLM system 110 over communications network 150. Depending on the implementation, the EPLM system 110 may be configured as a standalone posted listing generation/distribution tool or implemented to coordinate with an existing data entry host/repository 120. Therefore, a posted listing sponsor 100 may have access to primary EPLM system database 125 and/or secondary data entry host system database 135. The primary EPLM system database 125 may be configured as a stand-alone data storage solution (configured to store a sponsor's data entries and corresponding posted listings). Alternately, the primary EPLM system database 125 may be configured to coordinate data management with a data entry host/repository system 120 and secondary system database 135, storing underlying data entries and posted listing performance characteristics.

Depending on the implementation, the sponsor entity 100 may establish an underling data entry providing an offered good, service or opportunity with a data entry host site 120. The data entry host site 120 is often a data entry repository directed to a specific type of data entry and configured with specialized support tools that are often keyed to the specific data entry type, for example an employment opportunity search web site. By way of example only, the posted listing aggregation web site 115 may be configured as an online classified web site presenting ads to searching web users 145.

The EPLM system 110 may be configured to meet the needs of a particular posted listing sponsor 100. For example, the EPLM system 110 may be configured to facilitate automated posted listing generation. An EPLM system administrator 120, may develop a posted listing creation wizard and/or a series of design templates that assist a posted listing sponsor 100 with the posted listing generation process. Alternately, an EPLM system administrator 140 may work directly with a posted listing sponsor 100 to develop and implement a posted listing generation/distribution strategy.

FIG. 2 is a high-level flow diagram illustrating a basic flow of EPLM system functionality according to an embodiment of the invention. Each of the elements illustrated in FIG. 2 will be discussed in greater detail below with regard to FIGS. 3-8. The basic data flow is initiated when a sponsor logs into the system in step 200. The sponsor 100 is provided with the opportunity to access system components associated with posted listing generation/distribution or management of existing posted listings in step 210. Assuming the sponsor 100 selects generation/distribution, the system coordinates the generation and distribution of posted listings to a posted listing aggregation web site in step 220.

In step 230, the EPLM system 110 flow diagram shifts from system interaction with a sponsor 100 to system interaction with a searching web user 145. More specifically, the web user 145 views aggregated posted listings and may respond to a posted listings detailing available goods/services/opportunities. The EPLM system 110 facilitates the aspects of the web user response process as part of managing posted listing support resources in step 240.

The perspective of the flow diagram shifts again; this time transitioning from web user/EPLM system interaction, back to sponsor/EPLM system interaction. In step 250, the EPLM system coordinates notifying a sponsor and assisting with the sponsor's response to the web user's submission from step 230. In an embodiment of the invention, the EPLM system implements a posted listing performance module that records user data throughout the process, processes the data and provides performance data to the sponsor in step 260 (although it is to be understood that the sponsor may access performance data a variety of other instances during the process).

FIG. 3 illustrates aspects of the EPLM system that are associated with the data entry sponsor establishing posted listing generation/distribution parameters. The first step 300 involves a sponsor accessing the system via a communications network in step 300. A registered data entry sponsor is directed to the posted listing management dashboard 310 (discussed in greater detail in co-pending application, titled "Enhanced Posted Listing Support Resource Management", Ser. No. 11/618,587). The registered sponsor may use the management dashboard to modify generation/distribution parameters or review performance characteristics associated with any existing posted listing. Alternately, the system directs a non-registered user through registration module in step 315. As part of the registration process, the non-registered sponsor also has the opportunity to upload/create one or more data entries that will serve as the basis for posted listings At this point, the sponsor enters the primary generation/distribution process. The sponsor selects which data entries will serve as the basis for generating the posted listings in step 320. In step 330, the sponsor establishes the data entry information extraction rules. These are the rules that the EPLM system executes in extracting data from a base data entry and transitioning into the next step of creating a posted listing title/body, as well as associating metadata with a posted listing in step 343. In some embodiments, the sponsor may also establish a set of screening parameters that a posted listing applicant processing module may utilize to screen out unqualified applications, spam etc. . . . . Often a data entry provides a comprehensive description of a good, service or opportunity. However, because they are aggregated within a web site with a significant number of additional posted listings, the information in a posted listing should be presented as clearly and concisely, as possible. Accordingly, an EPLM extraction module may execute an automated parsing/extraction procedure on a base data entry. The extraction process then takes the key terms and incorporates them into a generated posted listing.

Alternately, the EPLM system may be configured with an interactive posted listing generation module. A sponsor may have certain aspects of the posted listing information that the sponsor wants to emphasize. For example, if the posted listing describes an employment opportunity, the sponsor may want to emphasize an offered salary or a particular type of educational requirement. The EPLM automated generation module may assist the sponsor in generating the posted listing heading and/or posted listing body.

Also, various posted listing aggregation web sites search posted listing based on metadata associated with posted listings. An implementation of the EPLM system may be configured with an automated or interactive metadata creation module that correlates extracted key terms with a posted listing heading. As such, when a web user searches the posted listing aggregation web site, these key terms may help the posted listing register as a 'hit' within search results.

In step 350, the sponsor establishes the EPLM system distribution rules. For example, in some implementations a sponsor can designate a particular target posted listing aggregation web site, as in step 353. Target site designations may be used during the generation process to select, retrieve and populate a posted listing design template associated with a particular aggregation web site. Additional distribution parameters, such as scheduling are established during this step of the generation/distribution process.

Depending on the embodiment, the EPLM system may be configured to incorporate additional support resources into the posted listings. In an implementation, the EPLM system may incorporate supplemental support resources that facilitated interaction with the data entry host web site in step 350. For example, the sponsor may incorporate posted linking tracking functionality into the distributed posted listing in step 353. Other functionality such as posted listing maintenance modules may be incorporated into the posted listing in step 356. For example, the EPLM support resource module may be configured to periodically update the posted listing, modify the description of the offered good, service or opportunity, or even remove the posted listing once an offered good/service is sold or an offered employment opportunity is filled.

FIG. 4A illustrates the aspects of the generation process for posted listings, according to an embodiment of the EPLM system. In an implementation, the process starts with the system receiving the sponsor's generation/distribution parameters in step 400. The EPLM system retrieves the designated data entries in step 405 from the primary/secondary system database. If the user has also established a target aggregation web site, the EPLM system also retrieves a corresponding aggregation site posted listing template in step 410 (assuming one exists). Alternately, the system may create the posted listing based on a system default template or implement a manual sponsor-driven posted listing generation design process. The EPLM system then applies the extraction rules to extract the core data from the designated data entries in step 415. The extracted information is used to populate the posted listing template in step 420, specifically creating the posted listing headline 423, body 426 and correlating meta data with the posted listing 429.

Some EPLM system implementations may be configured to incorporate support resources within the posted listing. In such implementation, the EPLM system executes a support resource incorporation module in step 430. The support resource modules may be configured to facilitate additional posted listing performance analysis such as web user interaction analysis and/or support for interaction with the data entry host web site. When the posted listings have been created, the EPLM system (or a system administrator) accesses the aggregation web site in step 435 and uploads the posted listings in step 440 to the aggregation web site.

FIG. 4B is an example of a full data entry 450 that is hosted by an employment opportunity host web site (e.g., MONSTER® of www.Monster.com). By way of example only, the EPLM system may be configured to identify and extract certain key parameters from the full data entry. It is to be understood that the EPLM system may be configured to coordinate with a variety of data entry host web sites. For example, the key term identification and extraction process may be keyed to a variety of shopping web sites, real estate listing web sites, and/or travel web sites. By way of example only, within the employment opportunity context, the EPLM system key terms may include the name of the data entry sponsor 455. Alternately, depending on the characteristics of an available good, service or opportunity, the key terms may be based on parameters such as: employment opportunity title 460, offered salary 465, geographic location, 470, job description 475, required qualifications 480, and/or key benefits 485. The base data entry also includes parameters such as, a reply-to email address, and/or date the opportunity was posted. Because the base data entry is often incorporated into the data entry host site, additional host-specific functionality may be included as part of the posted listing to emulate the host-specific functionality. For example, the data entry may include a host-specific application submission module 490.

FIG. 4C is an example of a posted listing created as a non-HTML posted listing 451, according to an embodiment of the invention. Some posted listing aggregation web sites may aggregate simple text-based posted listings and do not support HTML code within the posted listing. Accordingly, the EPLM system design templates and generation rules may be configured to create a non-HTML posted listing. As illustrated in FIG. 4C, these types of posted listings are clear and concise text-based descriptions directed to cover the bare essentials—posted listing heading 457, summarized job description 475, the base qualifications 480, offered salary 465, job location 470. Generally, non-HTML listings 451 rely on web-user initiative to apply for the job. As shown in FIG. 4C, the posted listing includes application information 490 such as: a job reference ID and an email address for submitting applications. Alternately, posted listing 451 provides the job-reference number along with a phone number 493 for an automated login/apply phone application for registered users.

FIG. 4D illustrates an example of an HTML based posted listing 452. The posted listing 452 includes core terms such as: job sponsor 455, job title 460, summarized job description 475, required qualifications 480, and the offered salary 465. However, as will be described below, additional functionality can be incorporated into HTML-based posted listings 452. For example, in addition to the core descriptors of employment opportunity title, listing sponsor, starting salary, etc. . . . , the EPLM system may be configured to incorporate host-specific support functionality. In one implementation, the EPLM system incorporates a click-apply link. For example, a web searcher who is also registered with the host site may click on the posted listing and the host will forward the registered user's application information to the sponsor. As illustrated in FIG. 4D, the HTML posting 452 may also include a link 468 to the full employment opportunity description in the data entry host system database. Alternately, application component 473 enables a web searcher to apply for an opportunity through the aggregation website. If the web user has not registered with data entry host, a register and apply link 476 may be incorporated with the posted listing 452. Additional support resources related to data tracking or posted listing maintenance may be incorporated into a posted listing, but remain transparent to the searching user.

FIG. 5A is a flow diagram illustrating aspects of searching user/EPLM system interaction according to an embodiment of the invention. In step 500, the web user accesses a posted listing aggregation web site. The web user then conducts a search of the aggregation web site in step 505 in order to create a list of relevant posted listings, (e.g., the search may be directed to a particular search term like "software engineer").

In step 510, the aggregation web site creates a resulting list of posted listings that displays the EPLM system generated headline/title associated with the posted listing. The user selects a posted listing title of interest in step 515 and the aggregation web site displays the body of the posted listing in step 520.

In an implementation, the support resources may be configured to display a confirmation page after a searching user applies to an opportunity within a posted listing. The confirmation page may be configured to provide additional related jobs from the sponsor and/or a data entry host entity web site.

FIG. 5B illustrates additional aspects of searching user/EPLM system interaction. In implementations of the invention that incorporate posted listing support resources, the process of displaying the posted listing body in step 525 initiates support modules, such as an EPLM data tracking module (the data recording process will be described in greater detail below with regard to FIG. 6). After the posted listing body is displayed, the web user has three main options: the web user may:

1. conduct a click—register/apply (530);
2. conduct an email apply (540); or
3. conduct a click-apply (550).

One fundamental difference between the web user's options relates to whether the web user has registered with the data entry host.

If the web user has not registered with the data entry host, the web user may select a click register/apply link 530. This link enables a web user to register with the data entry host site 533 and submit an application to the opportunity associated with the posted listing. In an embodiment, the web user may either fill-in an electronic data form 536 or and upload an electronic copy of a resume 536. In some implementations, the registration process may include an option to have the EPLM system forward other similar opportunities sent to the web user. Also, during the registration process, the web user may enter registration data by filling out an electronic registration form requesting various user information used for creating an electronic resume.

One implementation is related to further streamline the application process by generating an email directly to the sponsor, as well as populating the email subject line and body in step 540. If the user has not registered with the system host, the user can manually attach an electronic resume to the email 543. Alternately, the web user may upload a resume during the registration process. If a registered web user selects the direct email approach, the posted listing may generate the email to the sponsor, populate the subject line and body, as well as retrieve the user's stored resume and attach it to the email 546.

Further, a registered web user may select a "click to apply" link in step 550. The EPLM may be configured to spawn a new browsing window, log the user into the host site and populate the new window with the sponsor's full data entry in step 553. At this point, the web user can decide whether or not to actually submit resume information and apply for the employment opportunity in step 556.

The EPLM system forwards the submitted application/resume information to the sponsor's response database 560. In an implementation, the system may be configured to reject certain applications that do not meet a sponsor's established application screening parameters. The EPLM system may be configured to also notify the sponsor that a new web user response has been received 570. Based on the needs of a the sponsor, the EPLM system may be configured to generate and forward an email notification to the sponsor of a new application 573. In one embodiment, the notification email incorporates the web user's submission within the body of the email. The EPLM system is also configured to maintain the sponsor dashboard (shown in FIG. 8) to reflect the new submission in step 576. In some implementations, the web user's response and resume information may be embedded within the notification to the sponsor.

EPLM Controller

Figure 6:
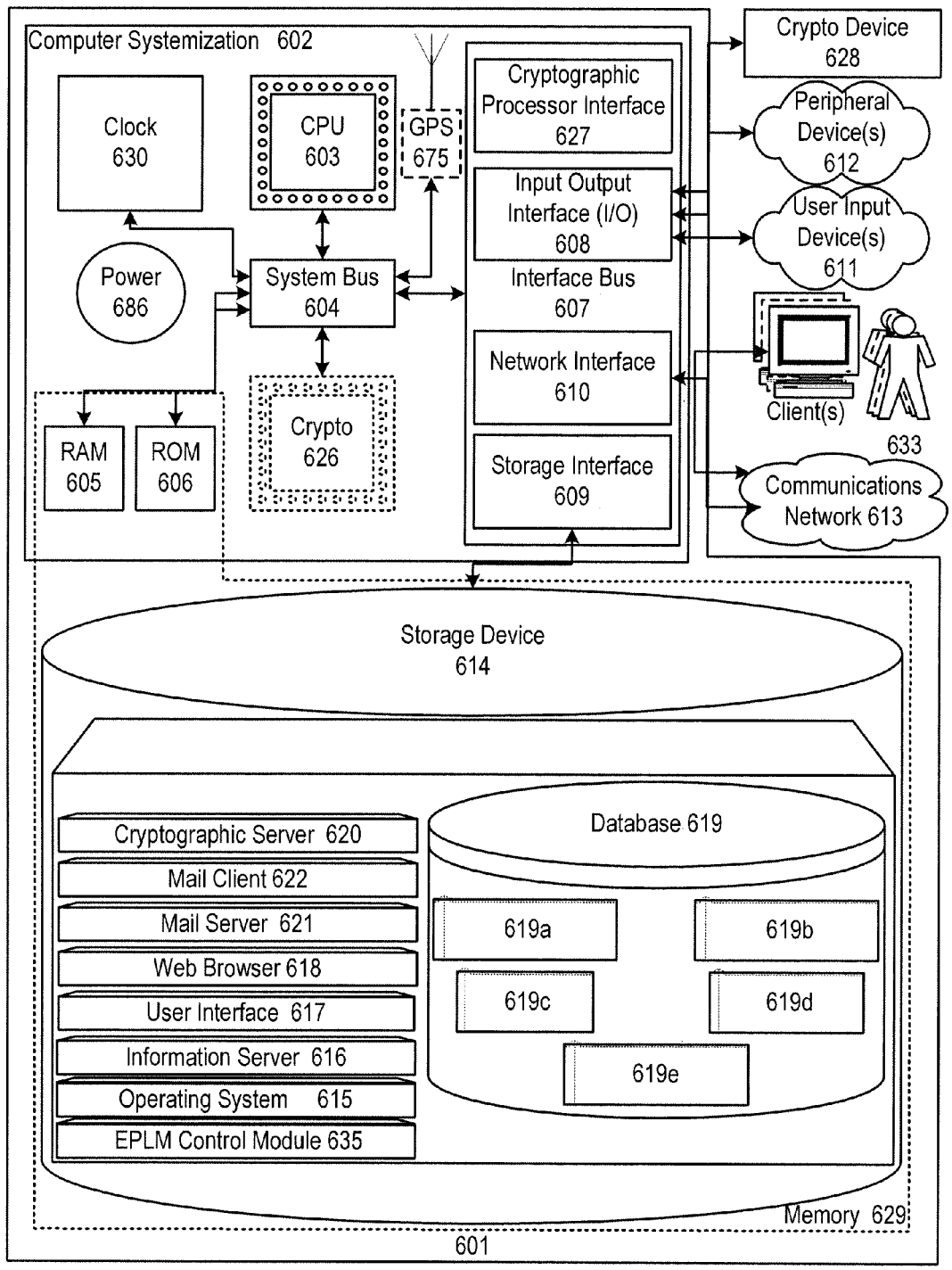
FIG. 6 illustrates aspects of an implementation of a EPLM system controller, according to an embodiment of the invention.

FIG. 6 of the present disclosure illustrates inventive aspects of a EPLM system controller 601 in a block diagram. In this embodiment, the EPLM controller 601 may serve to process, accept, retrieve, store, search, serve, submit, identify, transmit, instruct, generate, match, and/or update databases containing relevant posted listing, data entry, sponsor, and/or web user data.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components.

In one embodiment, the EPLM controller 601 may be connected to and/or communicate with entities such as, but not limited to: one or more users from user input devices 611; peripheral devices 612; and/or a communications network 613.

Networks are commonly thought to comprise the interconnection and interoperation of clients, servers, and intermediary nodes in a graph topology. It should be noted that the term "server" as used throughout this disclosure refers generally to a computer, other device, software, or combination thereof that processes and responds to the requests of remote users across a communications network. Servers serve their information to requesting "clients." The term "client" as used herein refers generally to a computer, other device, software, or combination thereof that is capable of processing and making requests and obtaining and processing any responses from servers across a communications network. A computer, other device, software, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The EPLM controller 601 may be based on common computer systems that may comprise, but are not limited to, components such as: a computer systemization 602 connected to memory 629.

Computer Systemization

A computer systemization 602 may comprise a clock 630, central processing unit (CPU) 603, a read only memory (ROM) 606, a random access memory (RAM) 605, and/or an interface bus 607, and most frequently, although not necessarily, are all interconnected and/or communicating through a system bus 604. Optionally, the computer systemization may be connected to an internal power source 686. Optionally, a cryptographic processor 626 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium, Xeon, Core and/or XScale; and/or the like processor(s). The CPU interacts with memory through signal passing through conductive conduits to execute stored program code according to conventional data processing techniques. Such signal passing facilitates communication within the EPLM controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 686 may be of any standard form for powering small electronic circuit board devices such as the following power cells: alkaline, lithium hydride, lithium ion, nickel cadmium, solar cells, and/or the like. Other types of AC or DC power sources may be used as well. In the case of solar cells, in one embodiment, the case provides an aperture through which the solar cell may capture photonic energy. The power cell 686 is connected to at least one of the interconnected subsequent components of the EPLM controller thereby providing an electric current to all subsequent components. In one example, the power source 686 is connected to the system bus component 604. In an alternative embodiment, an outside power source 686 is provided through a connection across the I/O 608 interface. For example, a USB and/or IEEE 1394 connection carries both data and power across the connection and is therefore a suitable source of power.

Interface Adapters

Interface bus(ses) 607 may accept, connect, and/or communicate to a number of interface adapters, conventionally although not necessarily in the form of adapter cards, such as but not limited to: input output interfaces (I/O) 608, storage interfaces 609, network interfaces 610, and/or the like. Optionally, cryptographic processor interfaces 627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 609 may accept, communicate, and/or connect to a number of storage devices such as, but not limited to: storage devices 614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 610 may accept, communicate, and/or connect to a communications network 613. Through a communications network 613, the EPLM controller is accessible through remote clients (e.g., computers with web browsers) by users 633. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 610 may be used to engage with various communications network types 613. For example, multiple network interfaces may be employed to allow for the communication over broadcast, multicast, and/or unicast networks.

Input Output interfaces (I/O) 608 may accept, communicate, and/or connect to user input devices 611, peripheral devices 612, cryptographic processor devices 628, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 611 may be card readers, dongles, finger print readers, gloves, graphics tablets, joysticks, keyboards, mouse (mice), remote controls, retina readers, trackballs, trackpads, and/or the like.

Peripheral devices 612 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the EPLM controller may be embodied as an embedded, dedicated, and/or monitor-less (i.e., headless) device, wherein access would be provided over a network interface connection.

Memory

Generally, any mechanization and/or embodiment allowing a processor to affect the storage and/or retrieval of information is regarded as memory 629. However, memory is a fungible technology and resource, thus, any number of memory embodiments may be employed in lieu of or in concert with one another. It is to be understood that the EPLM controller and/or a computer systemization may employ various forms of memory 629. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 629 will include ROM 606, RAM 605, and a storage device 614. A storage device 614 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); and/or other devices of the like. Thus, a computer systemization generally requires and makes use of memory.

Module Collection

The memory 629 may contain a collection of program and/or database modules and/or data such as, but not limited to: operating system module(s) 615 (operating system); information server module(s) 616 (information server); user interface module(s) 617 (user interface); Web browser module(s) 618 (Web browser); database(s) 619; cryptographic server module(s) 620 (cryptographic server); mail server module 622, mail client module 622, as well as the EPLM control module(s) 635; and/or the like (i.e., collectively a module collection). These modules may be stored and accessed from the storage devices and/or from storage devices accessible through an interface bus. Although non-conventional software modules such as those in the module collection, typically, are stored in a local storage device 614, they may also be loaded and/or stored in memory such as: peripheral devices, RAM, remote storage facilities through a communications network, ROM, various forms of memory, and/or the like.

Operating System

The operating system module 615 is executable program code facilitating the operation of the EPLM controller. Typically, the operating system facilitates access of I/O, network interfaces, peripheral devices, storage devices, and/or the like. The operating system may be a highly fault tolerant, scalable, and secure system such as Apple Macintosh OS X (Server), AT&T Plan 9, Be OS, Linux, Unix, and/or the like operating systems. However, more limited and/or less secure operating systems also may be employed such as Apple Macintosh OS, Microsoft DOS, Palm OS, Windows 2000/2003/3.1/95/98/CE/Millenium/NT/XP (Server), and/or the like. An operating system may communicate to and/or with other modules in a module collection, including itself, and/or the like. Most frequently, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. The operating system may provide communications protocols that allow the EPLM controller to communicate with other entities through a communications network 613. Various communication protocols may be used by the EPLM controller as a subcarrier transport mechanism for interaction, such as, but not limited to: multicast, TCP/IP, UDP, unicast, and/or the like.

Information Server

An information server module 616 is stored program code that is executed by the CPU. The information server may be a conventional Internet information server such as, but not limited to Apache Software Foundation's Apache, Microsoft's Internet Information Server, and/or the. The information server may allow for the execution of program modules through facilities such as Active Server Page (ASP), ActiveX, (ANSI) (Objective-) C (++), C#, Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on the EPLM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the EPLM controller, operating systems, other program modules, user interfaces, Web browsers, and/or the like.

Also, an information server may contain, communicate, generate, obtain, and/or provide program module, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, Microsoft's Windows XP, or Unix's X-Windows provide a baseline and means of accessing and displaying information graphically to users.

A user interface module 617 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), mythTV, and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A Web browser module 618 is stored program code that is executed by the CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program modules through facilities such as Java, JavaScript, ActiveX, and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the EPLM enabled nodes. The combined application may be nugatory on systems employing standard Web browsers.

The EPLM Database

The EPLM database 619 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the EPLM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the lead bidding system database is implemented as a data-structure, the use of the EPLM database 919 may be integrated into another component such as the EPLM controller module 635. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 619 includes several tables 619a-e. A sponsor's table 619a includes data such as, but not limited to: a sponsor's name, contact information, payment information, stored data entry listings, and/or the like. An aggregation table 619b includes data such as, but not limited to: a aggregation host web site information, contact information, posted listing design templates, maintenance configuration data, and/or the like. An extraction rules table 619c includes data such as, but not limited to: listings of key term(s), key term priority information, parsing protocols, and/or the like. A generation table 619d includes data such as, but not limited to: rules for generating the headline, the body and the meta data associated with a posted listing, and/or the like. A dashboard management table 619e includes data such as, but not limited to: performance characteristics at the sponsor level, the posted listing level, and/or the data entry level, as well as data tracking module protocol information, and/or the like. In one embodiment, the EPLM database may interact with other database systems. For example, employing a distributed database system, queries and data access by EPLM modules may treat the combination of the EPLM database and integrated data security layer database as a single database entity.

In one embodiment, user programs may contain various user interface primitives, which may serve to update the EPLM. Also, various accounts may require custom database tables depending upon the environments and the types of entities the EPLM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 619*a-e*. The EPLM may be configured to keep track of various settings, inputs, and parameters via database controllers.

The EPLM database may communicate to and/or with other components in a component collection, including itself, and/or facilities of the like. Most frequently, the EPLM database communicates with the EPLM controller module, other program components, and/or the like. The database may contain, retain, and provide information regarding other nodes and data.

EPLM Controller Module

The EPLM controller module 635 is stored program code that is executed by the CPU. The EPLM controller module affects accessing, obtaining and the provision of a EPLM, and/or the like across various communications networks. The EPLM enables sponsors to generate and distribute posted listings from base data entries, as well as evaluate performance characteristics associated with distributed posted listings.

The EPLM controller module enabling access of information between nodes may be developed by employing standard development tools such as, but not limited to: (ANSI) (Objective-) C (++), Apache modules, binary executables, database adapters, Java, JavaScript, mapping tools, procedural and object oriented development tools, PERL, Python, shell scripts, SQL commands, web application server extensions, WebObjects, and/or the like. The EPLM controller module may communicate to and/or with other modules in a module collection, including itself, and/or facilities of the like. Most frequently, the EPLM controller module communicates with the EPLM library, operating systems, other program modules, and/or the like. The EPLM controller module may contain, communicate, generate, obtain, and/or provide program module, system, user, and/or data communications, requests, and/or responses.

Distributed EPLM

The structure and/or operation of any of the EPLM controller components may be combined, consolidated, and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the EPLM controller will depend on the context of system deployment. Factors such as, but not limited to, the budget, capacity, location, and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles.

It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A processor-implemented method for managing job opportunity posted listings comprising:

receiving a selected job description data entry that will be incorporated into an aggregation listing web site as a job opportunity posted listing, wherein the selected job description data entry is provided by a sponsor entity in a bulk uploading of a plurality of job description data entries;

applying a job opportunity posted listing extraction rule to extract key terms from the selected job description data entry;

creating a job opportunity posted listing by populating the extracted key terms into a pre-defined job opportunity template;

incorporating a support resource module that tracks user interactions with the job opportunity posted listing into the job opportunity posted listing, wherein the support resource module is configured to display a confirmation message upon a user applying to a job opportunity within the job opportunity posted listing;

distributing the job opportunity posted listing with the incorporated support resource module to a posted listing aggregation web site;

receiving, via the support resource module incorporated into the job opportunity posted listing, an indication of user selection of the job opportunity listing; and presenting the confirmation message within the job opportunity posted listing via the support resource module after the user applies to the job opportunity;

determining job opportunity posted listing performance characteristics based on the received indication of user selection; and providing the determined job opportunity posted listing performance characteristics to a job opportunity posted listing sponsor.

2. The method of claim 1, further comprising:

selecting a posted listing design template based on posting requirements associated with the job opportunity posted listing aggregation web site; and retrieving the job opportunity posted listing design template from an aggregate posted listing template database.

3. The method of claim 2, wherein the job opportunity posted listing design template is selected based on a target aggregation selection.

4. The method of claim 3, further comprising: populating a job opportunity posted listing design template with the extracted key terms.

5. The method of claim 2, wherein the job opportunity posted listing design template is selected based on a system default design template.

6. The method of claim 2, wherein the creating the job opportunity posted listing is in accordance with user designated job opportunity posted listing design parameters.

7. The method of claim 2, further comprising establishing generic job opportunity posted listing maintenance parameters.

8. The method of claim 7, wherein the generic job opportunity posted listing maintenance parameters include establishing parameters that define the generic job opportunity posted listing update frequency.

9. The method of claim 2, wherein the extracted key terms are used to create a job opportunity posted listing headline and body.

10. The method of claim 9, wherein the extracted key terms are also used to create meta data that is associated with the created job opportunity posted listing.

11. A processor-implemented method for managing job opportunity posted listings comprising:

receiving a selected data entry that will be incorporated into an aggregation listing web site as a job opportunity posted listing;

applying a job opportunity posted listing extraction rule to extract key terms from the selected data entry;

processing extracted key terms to create a job opportunity posted listing;

incorporating a support resource module that tracks user interactions with the job opportunity posted listing into the job opportunity posted listing, wherein the support resource module is configured to display a confirmation message upon a user applying to a job opportunity within the job opportunity posted listing;

distributing the job opportunity posted listing with the incorporated support resource module to a job opportunity posted listing aggregation web site;

directing a web user to a full selected data entry within a data entry host web site;

providing the web user with the option to view additional related data entries related to a base data entry; and generating an additional process to display additional data entries that are related to the selected data entry.

12. The method of claim 11, further comprising:

maintaining job opportunity posted listing generation and distribution parameters in a sponsor posted listing management dashboard.

13. The method of claim 12, wherein the generation and distribution parameters associated with a job opportunity posted listing are modifiable after the job opportunity posted listing has been distributed.

14. The method of claim 11, wherein the additional data entries are related by subject matter to the base data entry.

15. The method of claim 11, wherein the additional data entries are related by data entry sponsor entity.

16. The method of claim 11, further comprising:

delivering subsequent job opportunity posted listings to a registered user that would qualify as related additional data entries.

17. The method of claim 16, wherein the subsequent job opportunity posted listings are selected based on being associated with a data entry sponsor.

18. The method of claim 16, wherein the subsequent job opportunity posted listings are correlated with similar subject matter as the distributed job opportunity posted listing.

19. A processor-implemented method for managing job opportunity posted listings comprising:

receiving a selected data entry that will be incorporated into an aggregation listing web site as a job opportunity posted listing;

applying a job opportunity posted listing extraction rule to extract terms from the selected data entry;

processing extracted key terms to create a job opportunity posted listing;

incorporating a support resource module that tracks user interactions with the job opportunity posted listing into the job opportunity posted listing, wherein the support resource module is configured to display a confirmation message upon a user applying to a job opportunity within the job opportunity posted listing;

distributing the job opportunity posted listing with the incorporated support resource module to a job opportunity posted listing aggregation web site;

activating a user application module associated with the job opportunity posted listing after a user interaction indicator is received; and generating a notification detailing an applicant submission for the subject matter detailed in the job opportunity posted listing.

20. The method of claim 19, wherein the user application module facilitates a 'click register and apply' process.

21. The method of claim 19, wherein the user application module facilitates a direct email application process.

22. The method of claim 19, wherein the user application module facilitates a click and apply process.

23. A system for managing job opportunity posted listings comprising:

a processor;

a memory in communication with the processor and containing program instructions;

an input and output in communication with the processor and memory, wherein the processor executes program instructions contained in the memory and the program instructions comprise:

receiving a selected data entry that will be incorporated into an aggregation listing web site as a job opportunity posted listing;

applying a posted listing extraction rule to extract key terms from the selected data entry;

processing extracted key terms to create a job opportunity posted listing;

incorporating a support resource module that tracks user interactions with the job opportunity posted listing into the job opportunity posted listing, wherein the support resource module is configured to display a confirmation message upon a user applying to a job opportunity within the job opportunity posted listing; and distributing the job opportunity posted listing with the incorporated support resource module to a posted listing aggregation web site.

24. The system of claim 23, wherein the instructions further comprise:

selecting a job opportunity posted listing design template based on posting requirements associated with the listing aggregation web site; and retrieving the job opportunity posted listing design template from an aggregate posted listing template database.

25. The system of claim 24, further comprising establishing generic job opportunity posted listing maintenance parameters.

26. The system of claim 25, wherein the generic job opportunity posted listing maintenance parameters include establishing parameters that define the generic job opportunity posted listing update frequency.

27. The system of claim 24, wherein the extracted key terms are used to create a job opportunity posted listing headline and body.

28. The system of claim 27, wherein the extracted key terms are also used to create meta data that is associated with the created job opportunity posted listing.

29. The system of claim 24, wherein the job opportunity posted listing design template is selected based on a target aggregation selection.

30. The system of claim 29, wherein processing the extracted key terms involves populating a job opportunity posted listing design template with the extracted key terms.

31. The system of claim 24, wherein the job opportunity posted listing design template is selected based on a system default design template.

32. The system of claim 24, wherein
the creating the job opportunity posted listing is in accordance with user designated posted listing design parameters.

33. A system for managing job opportunity posted listings comprising:

a processor;

a memory in communication with the processor and containing program instructions;

an input and output in communication with the processor and memory, wherein the processor executes program instructions contained in the memory and the program instructions comprise:

receiving a selected data entry that will be incorporated into an aggregation listing web site as a job opportunity posted listing;

applying a job opportunity posted listing extraction rule to extract key terms from the selected data entry;

processing extracted key terms to create a job opportunity posted listing;

incorporating a support resource module that tracks user interactions with the job opportunity posted listing into the job opportunity posted listing, wherein the support resource module is configured to display a confirmation message upon a user applying to a job opportunity within the job opportunity posted listing;

distributing the job opportunity posted listing with the incorporated support resource module to a job opportunity posted listing aggregation web site;

directing a web user to the full selected data entry within the data entry host web site;

providing the web user with the option to view additional related data entries related to a base data entry; and generating an additional process to display additional data entries that are related to the base data entry.

34. The system of claim 33, wherein the instructions further comprise:

maintaining job opportunity posted listing generation and distribution parameters in a sponsor posted listing management dashboard.

35. The system of claim 34, wherein the generation and distribution parameters associated with a job opportunity posted listing are modifiable after the job opportunity posted listing has been distributed.

36. The system of claim 33, wherein the additional data entries are related by subject matter to the base data entry.

37. The system of claim 33, wherein the additional data entries are related by data entry sponsor entity.

38. The system of claim 33, wherein the instructions further comprise:

delivering subsequent job opportunity posted listings to a registered user that would qualify as related additional data entries.

39. The system of claim 38, wherein the subsequent job opportunity posted listings are selected based on being associated with a data entry sponsor.

40. The system of claim 38, wherein the subsequent job opportunity posted listings are correlated with similar subject matter as the distributed posted listing.

41. A system for managing job opportunity posted listings comprising:

a processor;
    a memory in communication with the processor and containing program instructions;
    an input and output in communication with the processor and memory, wherein the processor executes program instructions contained in the memory and the program instructions comprise:
        receiving a selected data entry that will be incorporated into an aggregation listing web site as a job opportunity posted listing;
        applying a job opportunity posted listing extraction rule to extract key terms from the selected data entry;
        processing extracted key terms to create a job opportunity posted listing;
        incorporating a support resource module that tracks user interactions with the job opportunity posted listing into the job opportunity posted listing,
            wherein the support resource module is configured to display a confirmation message upon a user applying to a job opportunity within the job opportunity posted listing;
        distributing the job opportunity posted listing with the incorporated support resource module to a job opportunity posted listing aggregation web site;
        activating a user application module associated with the job opportunity posted listing after a user interaction indicator is received; and
        generating a notification detailing an applicant submission for the subject matter detailed in the job opportunity posted listing.

42. The system of claim 41, wherein the user application module facilitates a 'click register and apply' process.

43. The system of claim 41, wherein the user application module facilitates a direct email application process.

44. The system of claim 41, wherein the user application module facilitates a click and apply process.

* * * * *